Patented May 9, 1944

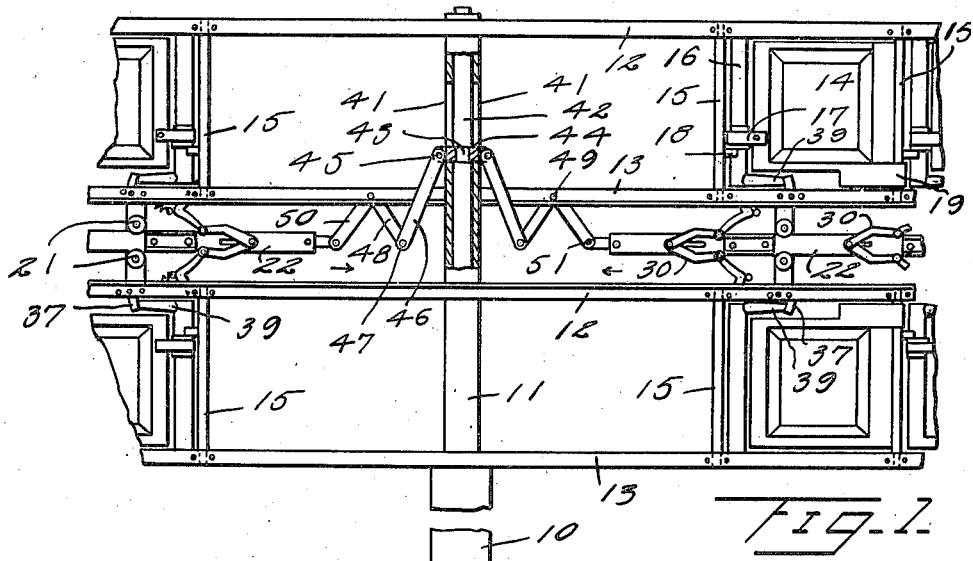
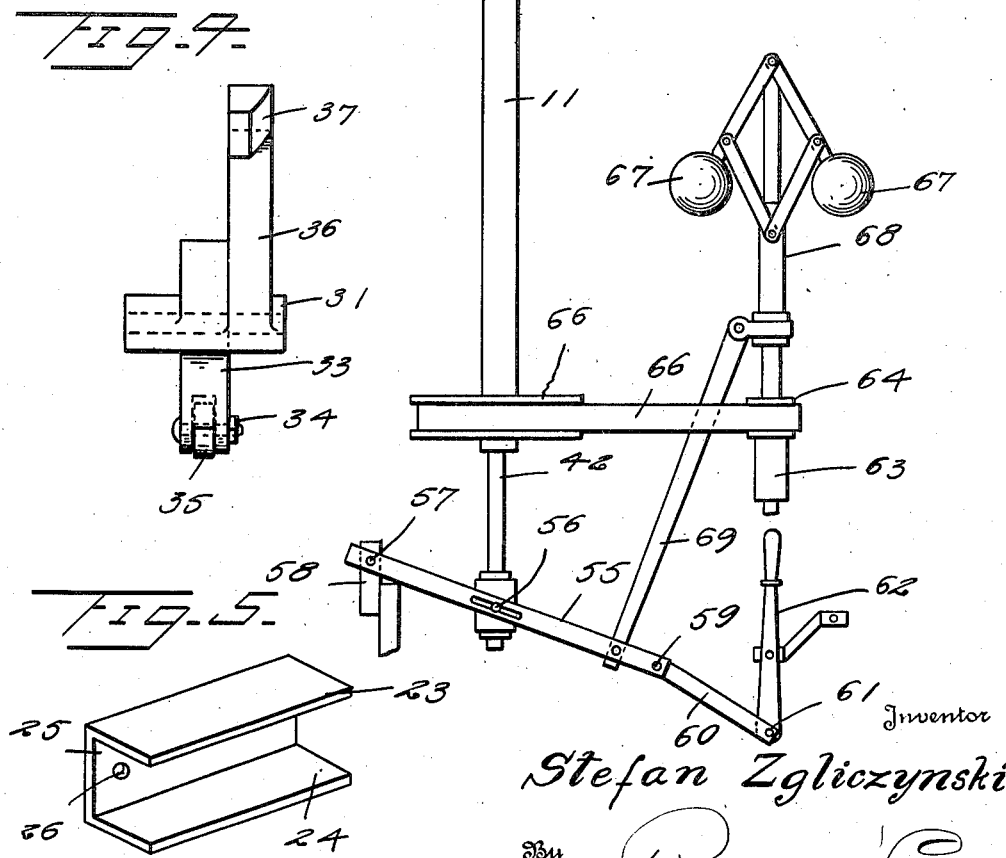

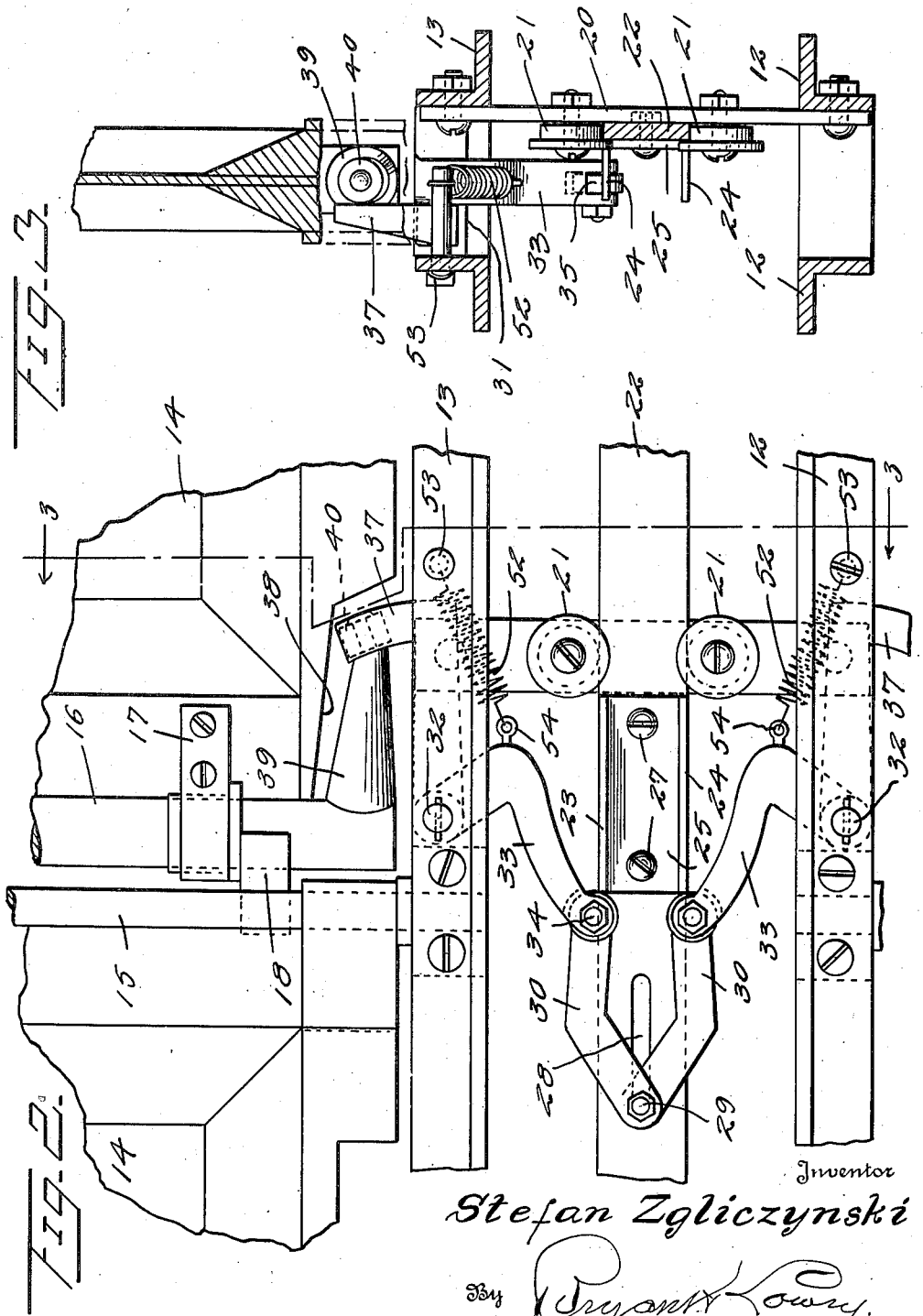

2,348,671

UNITED STATES PATENT OFFICE 2,348,671

AUTOMATIC WIND MOTOR

Stefan Zgliczynski, Baltimore, Md.

Application June 1, 1942, Serial No. 445,347

5 Claims. (Cl. 170—24)

This invention relates to certain new and useful improvements in automatic wind motors of the general type disclosed in patents issued Stefan Zgliczynski on June 16, 1925, Patent No. 1,542,433, and on June 21, 1927, Patent No. 1,633,428 and embodies improvements in the art thereover.

The automatic wind motor disclosed herein is of the type embodying feathering blades for lessening or retarding the speed of rotation of an associated driven shaft with the outer end blades of each motor arm being initially feathered with the other blades of each arm being sequentially opened in an inward direction, either singly or in groups.

The primary object of the present invention particularly relates to improvements in the arm or latch devices for holding the blades against feathering movements and in particular to the operating devices for the blade retaining arms or latches resulting in a smoothly and efficiently operating mechanism.

With the above and other objects in view that will become apparent as the nature of the invention is better understood, the same consists in the novel form, combination and arrangement of parts hereinafter more fully described, shown in the accompanying drawings and claimed.

In the drawings:

Figure 1 is a fragmentary side elevational view of an automatic wind motor constructed in accordance with the present invention and illustrating vertically disposed pairs of radial feathering blade carrying arms with the control devices for the blades located between each pair of arms and governor mechanism for the operation of the blade-controlling devices, Figure 2 is a fragmentary side elevational view of one of the radial arms showing the tensioned latch devices for retaining the arms against feathering movements and the slide bar carrying a laterally disposed channel member for simultaneous operation of upper and lower latch devices, Figure 3 is a vertical cross-sectional view taken on line 3—3 of Figure 2 showing the latch arm retainingly engaged with a roller carried by an arm laterally projecting from the adjacent end of the pivot shaft for a feathering blade, Figure 4 is an elevational view of one of the latch arms showing the unitary construction thereof, and Figure 5 is a perspective view of one of the channel members detached from its slide bar for simultaneous operation of upper and lower blade controlling latch arms.

Referring more in detail to the accompanying drawings and particularly to Figure 1, the reference character 10 designates a fixed tubular bearing within which rotates a tubular sleeve 11 projecting above and below the bearing and from which sleeve, by rotation thereof, power is derived for the driving of any suitable machine. The wind motor per se is fixed to the upper end of the tubular sleeve 11 while control device for regulating the speed of the wind motor are associated with the lower end of the tubular shaft.

The wind motor per se comprises a plurality of radial arms with each arm comprising a pair of frame structures in superposed spaced relation with feathering blades carried by each frame structure. Each frame structure comprises an upper and lower bar 12 and 13 respectively radiating from the tubular shaft 11 and pivotally supporting therebetween a plurality of feathering blades 14, the bars 12 and 13 being connected by brace rods 15 adjacent each blade 14. For the pivotal support of each blade, there is provided a side post 16 journaled at its upper and lower ends in the radial arms 12 and 13 adjacent a brace rod 15 and each post 16 is attached to its blade 14 by the strap connection 17 shown more clearly in Figure 2. To limit closing movement of the blade, a lug 18 projecting laterally of the pivot post 16 is engaged with one side of an adjacent brace rod 15, while a lug extension 19 on the free vertical edge of the blade is engaged with the opposite side of an adjacent brace rod as shown in Figure 1.

The mechanism for holding the blades against feathering movement and for the release of the blades to permit feathering movements in the event of excessive speed of rotation, is shown more clearly in Figures 1 and 2 and such mechanism is disposed between the lower radial bar 13 of the upper blade carrying frame structure and the upper rail 12 of the lower frame structure, these bars 12 and 13 being connected by cross bars 20, each of which carries spaced guide wheels 21 for a longitudinally shiftable rod 22 disposed centrally between the bars 12 and 13. A latch arm operating device is carried by the slide rod 22 for each blade 14 and said device is in the form of a side opening U-shaped channel member having upper and lower flanges 23 and 24 projecting at right angles from a base plate 25 that is apertured as at 26 for the passage of fastening pins, screws or the like 27 for securing it to a side face of the slide rod 22.

The latch arm devices for controlling feathering movements of the blades 14 are arranged in pairs for the adjacent upper and lower blades 14 and as shown in Figures 1 and 2, the slide bar 22 is provided with spaced longitudinally extending slots 28 through which a pivot pin 29 freely extends for the pivotal support of a pair of angular links 30. Corresponding ends of the angular links 30 are pivoted to the pin 29 and the free ends of said links are pivoted to multi-armed latch levers of unitary construction shown in detail in Figure 4 as comprising an intermediate bearing hub 31 with a multi-armed latch lever having its hub portion 31 pivoted as at 32 upon the frame bars 12 and 13. An arm of bell-crank formation extends from one side of the bearing hub 31, the leg 33 thereof including in its pivotal connection 34 with the free end of the adjacent angular link 30, a bearing roller 35 disposed for engagement with the adjacent flanges 23 or 24 of the latch arm operating device and as shown in Figure 2. An arm 36 projects from the other side of the hub bearing 31 of the multi-arm lever and normally lies substantially parallel and laterally of the adjacent bar 12 or 13 with an outwardly directed lug 37 at the free end of the arm that extends into the space afforded by the cut-away portion 38 in the adjacent edge of the blade 14 as shown in Figure 2. An arm 39 projects laterally of the lower end of the journaled post 16 of the blade and carries at its free end a roller 40 that is engaged by the lug 37, the arm 39 extending into the cut-away space 38 as illustrated. The engagement of the lug 37 with the arm 39 and the engagement of the lugs 18 and 19 with the brace rods 15 retain the blade 14 in a rigidly mounted condition and against feathering movements.

As shown in Figure 1, the upper end of the tubular shaft 11 within the upper frame structure of a radial arm of the motor is longitudinally slotted as at 41 and extending through said tubular shaft 11 is a slide rod 42, the rod having a reduced neck 43 for the reception of a collar 44 to the periphery of which is pivotally attached as at 45 a link 46. The free end of the link 46 is pivotally attached at 47 to the leg 48 of a bell-crank lever, which lever is pivoted at 49 to the frame bar 13, while the other leg 50 of said bell-crank lever is pivotally attached at 51 to the adjacent end of the slide rod 22. When the collar 44 is raised in a manner to be presently described, movement of the bell-crank lever comprising the legs 48 and 50 under influence of the link 46 affects a pull on the slide rod 22 which causes the flanges 23 and 24 of the U-shaped latch arm operating device to shift the pivotal connection 34 between the angular links 30 and the multi-armed levers and a consequent displacement of the lug 37 carried by the lever arm 36 relative to the free end of the arm 39 carried by the journaled post 16 whereupon blade 14 is permitted to move or feather to an open position. It will be understood that the slots 28 in the slide rod 22 are of varying lengths to effect a sequential opening inwardly of the blades from the outer ends of the arms, the slide rod 22 being uneffective for the operation of the connected angular links and multi-armed levers until a closed end of a slot engages a pivot pin 29. The lugs 37 of the multi-armed levers are normally retained in engaging position with the arms 39 by spring devices 52 extending between a frame bar 12 or 13 as shown at 53 with the opposite ends of the spring devices attached as at 54 to the lever arms 33.

The devices for shifting the rod 22 to effect feathering movements of the blades 14 are shown in Figure 1 and comprise both automatic and manually operated devices. A lever 55 has a pin and slot connection 56 intermediate its ends with the lower end of the shaft 42, the free end of the lever 55 being pivoted as at 57 to a fixed support 58 while the other end of the lever 55 is pivotally attached as at 59 to one end of a link 60 that has pivotally attached at its other end as at 61, one end of a hand-operated lever 62. Operation of the lever 62 elevates the rod 42 for the operation of the latch devices controlling the feathering of the blades.

For the automatic feathering of the blades in the presence of an excessive speed of rotation of the wind motor, a rotary governor mechanism is provided and includes a journaled sleeve 63 carrying a pulley 64 cooperating with the pulley 65 on the tubular shaft 11 by means of the belt connection 66. A ball governor 67 is associated with the upper end of the rotating sleeve 63 and the slide sleeve 68 of the ball governor has a link rod connection 69 with the lever 55 which in turn effects an upward movement of the rod 42 for the operation of the blade retaining latch devices.

From the above detailed description of the invention it is believed that the construction and operation thereof will at once be apparent, and while there is herein shown and described the preferred embodiment thereof, it is to be understood that minor changes may be made therein, such as will fall within the scope of the invention as claimed.

I claim:

1. In control means for the feathering blades of a wind motor, a plurality of radial members comprising side bars, a series of blades pivotally mounted in the side bars of each member, an arm projecting from the pivoted side of each blade, a slide rod associated with each series of blades, each slide rod having a slot therein for each blade of the series with the slots of gradually increasing lengths, a pair of angular links pivotally connected with the pivot freely extending through an adjacent slot in the slide rod, a unitary multi-armed lever pivoted to a side bar, an angle arm of said lever pivoted to an adjacent angular link, a lug carried by another arm of the multi-armed lever engageable with the arm projecting from said blade, cross rods extending between the side bars, guide wheels carried by the cross rods between which the slide rod is movable and means for operating said slide rod.

2. In control means for the feathering blades of a wind motor, a plurality of radial members comprising side bars, a series of blades pivotally mounted in the side bars of each member, an arm projecting from the pivoted side of each blade, a slide rod associated with each series of blades, each slide rod having a slot therein for each blade of the series with the slots of gradually increasing lengths, a pair of angular links pivotally connected with the pivot freely extending through an adjacent slot in the slide rod, a unitary multi-armed lever pivoted to a side bar, an angle arm of said lever pivoted to an adjacent angular link, a lug carried by another arm of the multi-armed lever engageable with the arm projecting from said blade, the pivotal connection between the multi-armed lever and angular link including a roller and a side opening U-shaped channel member secured to a side of the slide rod with the top and bottom flanges thereof movable into engagement with said roller for operation of said multi-armed lever for the release of the blades and means for operating said slide rod.

3. In control means for the feathering blades of a wind motor, a plurality of radial members comprising side bars, a series of blades pivotally mounted in the side bars of each member, an arm projecting from the pivoted side of each blade, a slide rod associated with each series of blades, each slide rod having a slot therein for each blade of the series with the slots of gradually increasing lengths a pair of angular links pivotally connected with the pivot freely extending through an adjacent slot in the slide rod, a unitary multi-armed lever pivoted to a side bar, an angle arm of said lever pivoted to an adjacent angular link, a lug carried by another arm of the multi-armed lever engageable with the arm projecting from said blade, a spring interposed between a side bar and the adjacent multi-armed lever for holding the lug of said lever normally engaged with the arm of the blade, the pivotal connection between the multi-armed lever and angular link including a roller and a side opening U-shaped channel member secured to a side of the slide rod with top and bottom flanges thereof movable into engagement with said roller for operation of said multi-armed lever for the release of the blades and means for operating said slide rod.

4. In control means for the feathering blades of a wind motor, a plurality of radial members comprising side bars, a series of blades pivotally mounted in the side bars of each member, an arm projecting from the pivoted side of each blade, a slide rod associated with each series of blades, each slide rod having a slot therein for each blade of the series with the slots of gradually increasing lengths, a pair of angular links pivotally connected with the pivot freely extending through an adjacent slot in the slide rod, a unitary multi-armed lever pivoted to a side bar, an angle arm of said lever pivoted to an adjacent angular link, a lug carried by another arm of the multi-armed lever engageable with the arm projecting from said blade, cross rods extending between the side bars, guide wheels carried by the cross rods between which the slide rod is movable, the pivotal connection between the multi-armed lever and angular link including a roller and a side opening U-shaped channel member secured to a side of the slide rod with the top and bottom flanges thereof movable into engagement with said rollers for operation of said multi-armed lever for the release of the blades and means for operating said slide rod.

5. In control means for the feathering blades of a wind motor, a plurality of radial members comprising side bars, a series of blades pivotally mounted in the side bars of each member, an arm projecting from the pivoted side of each blade, a slide rod associated with each series of blades, each slide rod having a slot therein for each blade of the series with the slots of gradually increasing lengths, a pair of angular links pivotally connected with the pivot freely extending through an adjacent slot in the slide rod, a unitary multi-armed lever pivoted to a side bar, an angle arm of said lever pivoted to an adjacent angular link, a lug carried by another arm of the multi-armed lever engageable with the arm projecting from said blade, the multi-armed lever including a bearing hub with the arms of the lever being of bell-crank formation, the pivotal connection between the multi-armed lever and angular link including a roller and a side opening U-shaped channel member secured to a side of the slide rod with the top and bottom flanges thereof movable into engagement with said rollers for operation of said multi-armed lever for the release of the blades and means for operating said slide rod.

STEFAN ZGLICZYNSKI.